(12) United States Patent
Merboth et al.

(10) Patent No.: US 12,532,881 B2
(45) Date of Patent: Jan. 27, 2026

(54) TISSUE PACKAGING AND METHOD OF USING SAME

(71) Applicant: LifeCell Corporation, Madison, NJ (US)

(72) Inventors: Barbara L. Merboth, Bridgewater, NJ (US); Jennifer Hwang, Branchburg, NJ (US); Suranga Suraweera, Morristown, NJ (US)

(73) Assignee: LifeCell Corporation, North Chicago, IL (US)

( * ) Notice: Subject to any disclaimer, the term of this patent is extended or adjusted under 35 U.S.C. 154(b) by 1106 days.

(21) Appl. No.: 17/400,346

(22) Filed: Aug. 12, 2021

(65) Prior Publication Data

US 2022/0053755 A1    Feb. 24, 2022

Related U.S. Application Data

(60) Provisional application No. 63/067,497, filed on Aug. 19, 2020.

(51) Int. Cl.
*A01N 1/128*    (2025.01)
*A01N 1/14*    (2025.01)
*A61F 2/00*    (2006.01)

(52) U.S. Cl.
CPC ............... *A01N 1/128* (2025.01); *A01N 1/14* (2025.01); *A61F 2/0095* (2013.01); *A61F 2250/0091* (2013.01)

(58) Field of Classification Search
CPC ......... A01N 1/128; A01N 1/14; A61F 2/0063; A61F 2210/0076; A61F 2220/0091; A61L 27/3683
See application file for complete search history.

(56) References Cited

U.S. PATENT DOCUMENTS

| | | | |
|---|---|---|---|
| 5,213,619 A | 5/1993 | Jackson et al. | |
| 5,336,616 A | 8/1994 | Livesey et al. | |
| 5,788,661 A | 8/1998 | Japuntich | |
| 6,933,326 B1 | 8/2005 | Griffey et al. | |
| 7,108,832 B2 | 9/2006 | Christensen et al. | |
| 7,358,284 B2 | 4/2008 | Griffey et al. | |
| 7,560,113 B2 | 7/2009 | Christensen | |
| 7,771,652 B2 | 8/2010 | Christopher et al. | |
| 2003/0036797 A1* | 2/2003 | Malaviya ................ | A61L 27/18 623/908 |
| 2003/0143207 A1 | 7/2003 | Livesey et al. | |
| 2005/0028228 A1 | 2/2005 | McQuillan et al. | |
| 2005/0268573 A1 | 12/2005 | Yan | |
| 2005/0281856 A1 | 12/2005 | McGlohom et al. | |

(Continued)

FOREIGN PATENT DOCUMENTS

| | | |
|---|---|---|
| KR | 20190010467 A * | 1/2019 |
| WO | 2009/150488 A1 | 12/2009 |

OTHER PUBLICATIONS

Eckert et al., Supercritical fluids as solvents for chemical and materials processing. Nature. Sep. 26, 1996;383:313-318.

(Continued)

*Primary Examiner* — Lydia Edwards
(74) *Attorney, Agent, or Firm* — McCarter & English, LLP

(57) ABSTRACT

The present disclosure provides tissue matrix packaging devices and methods of use. The packaging can be used to help a tissue matrix sample retain its shape when being stored or transported.

16 Claims, 6 Drawing Sheets

(56) References Cited

U.S. PATENT DOCUMENTS

| | | |
|---|---|---|
| 2006/0073592 A1 | 4/2006 | Sun et al. |
| 2007/0092398 A1 | 4/2007 | McDonald |
| 2007/0110820 A1 | 5/2007 | Behnam |
| 2007/0248575 A1 | 10/2007 | Connor et al. |
| 2008/0027542 A1 | 1/2008 | McQuillan et al. |
| 2008/0240981 A1 | 10/2008 | Berentsveig et al. |
| 2009/0035289 A1 | 2/2009 | Wagner et al. |
| 2009/0306790 A1 | 12/2009 | Sun |
| 2010/0040687 A1 | 2/2010 | Pedrozo et al. |
| 2010/0137677 A1 | 6/2010 | Friedman et al. |
| 2010/0137817 A1 | 6/2010 | Hardman et al. |
| 2010/0161054 A1 | 6/2010 | Park et al. |
| 2010/0196905 A1 | 8/2010 | McNulty et al. |
| 2010/0209408 A1 | 8/2010 | Stephen A. et al. |
| 2010/0272782 A1 | 10/2010 | Owens et al. |
| 2014/0193299 A1 | 7/2014 | Leamy et al. |
| 2016/0296652 A1 | 10/2016 | Leamy et al. |

OTHER PUBLICATIONS

Jessop et al., Homogeneous catalytic hydrogenation of supercritical carbon dioxide. Nature. Mar. 17, 1994;368:231-233.

Poliakoff et al., A supercritical success story. Chemistry & Industry. 1999;19:750-752.

Poliakoff et al., Intermediates in organometallic and organic chemistry: spectroscopy, polymers, hydrogenation and supercritical fluids. Journal of Physical Organic Chemistry. 1998;11:589-596.

Qiu et al., Inactivation of Bacterial Spores and Viruses in Biological Material Using Supercritical CarbonDioxide with Sterliant. J Biomed Mater Res Part B: Appl Biomater. 2009;91B:572-578.

Spilimbergo et al., Non-thermal bacterial inactivation with dense $CO(2)$. Biotechnol Bioeng. Dec. 20, 2003;84(6):627-38.

Strattice Reconstructive Tissue Matrix Perforated. Lifecell Corporation. Jun. 2015, 2 pages.

White et al., Effective Terminal Sterilization Using Supercritical Carbon Dioxide. Journal of Biotechnology. 2006;123:504-515.

\* cited by examiner

TISSUE PACKAGING AND METHOD OF USING SAME

This application claims priority under 35 USC § 119 to U.S. Provisional Application 63/067,479, which was filed on Aug. 19, 2020 and is incorporated by reference in its entirety.

The present disclosure relates to tissue matrix products and methods of packaging thereof. In particular, embodiments of the invention relate to acellular tissue matrix products, including methods of packaging.

There is currently a need for improved packaging for storage and delivery of tissue products, such as acellular tissue matrix products. A current method includes packaging tissue in various storage solutions inside a pouch. However, current storage methods, although effective, may result in surface or shape imperfections of the tissue product.

For many surgical procedures, in order to achieve desired results, surgeons prefer acellular tissue matrix products with a uniform shape, thickness, or surface texture. Furthermore, surgeons need to be able to aseptically transfer the tissue from the packaging to the sterile preparation area.

Accordingly, the present disclosure provides a tissue package product for tissue products such as acellular tissue matrix products. The disclosure also provides methods of packaging such products.

The present disclosure provides improved packaging for acellular tissue matrix products including an inner structure comprising a mesh material, a storage solution in contact with the tissue matrix product, and an outer barrier structure, wherein the inner structure is contained in the outer structure, wherein the inner and outer structures are configured to hold a sheet of acellular tissue matrix, and wherein the mesh material improves the shape retention and/or surface cosmetics of the tissue matrix product.

The present disclosure also provides methods of packaging tissue products.

BRIEF DESCRIPTION OF THE DRAWINGS

Reference will now be made to exemplary embodiments, examples of which are illustrated in the accompanying drawings. Wherever possible, the same reference numbers will be used throughout the drawings to refer to the same or like parts. The drawings are not necessarily to scale.

DETAILED DESCRIPTION OF EXEMPLARY EMBODIMENTS

Figure 1:
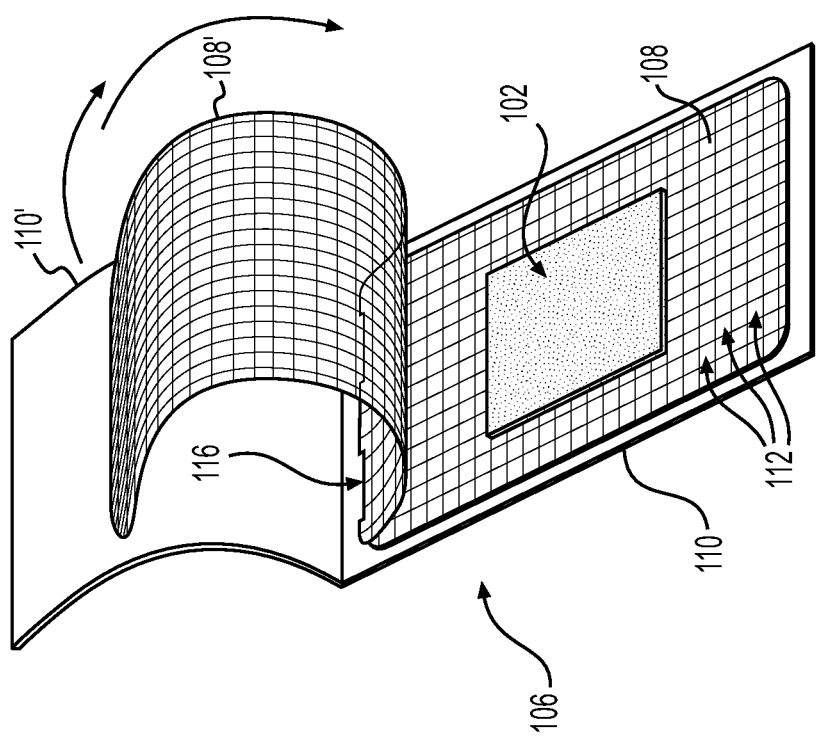
FIG. 1 illustrates an open view of a tissue product and associated packaging, according to certain exemplary embodiments.

Reference will now be made in detail to various embodiments of the disclosed products, devices and methods, examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," and other forms, such as "includes" and "included," is not limiting. Any range described herein will be understood to include the endpoints and all values between the endpoints.

The section headings used herein are for organizational purposes only and are not to be construed as limiting the subject matter described. All documents, or portions of documents, cited in this application, including but not limited to patents, patent applications, articles, books, and treatises, are hereby expressly incorporated by reference in their entirety for any purpose.

The present disclosure relates generally to tissue packaging products and methods relating to their use. The acellular tissue matrix products discussed herein can be used for tissue augmentation, repair or regeneration of damaged tissue, and/or correction of tissue defects. As such, the devices, systems, and methods discussed herein can be suitable for a wide range of surgical applications, such as, for example, aesthetic surgery, breast reconstruction, breast augmentation, breast enhancement, breast reduction, revisionary breast surgeries, abdominal wall repair, ligament or tendone treatment, dura replacement, or other soft or hard tissue treatements.

The acellular tissue matrix products used in the devices described herein can include a variety of different materials. For example, an acellular tissue matrix or other tissue product can be selected to allow tissue ingrowth and remodeling to assist in regeneration of tissue normally found at the site where the matrix is implanted. For example, an acellular tissue matrix, when implanted on or into subdermal tissue, fascia, mammary tissue, muscle, bone, adipose or other tissue, may be selected to allow regeneration of the tissue without excessive fibrosis or scar formation. In certain embodiments, the devices can be formed from ALLODERM®, STRATTICE®, or ARTIA® (LIFECELL® CORPORATION, BRANCHBURG, NJ) which are acellular dermal matrices. Alternatively, other suitable acellular tissue matrices can be used. For example, a number of suitable biological scaffold materials are described by Badylak et al. "Extracellular Matrix as a Biological Scaffold Material: Structure and Function," Acta Biomaterialia (2008), doi: 10.1016/j.actbio.2008.09.013.

The devices described herein can be produced from a variety of different human or animal tissues including human, porcine, ovine, bovine, or other animals tissues. Further, although described particularly for use with acellular tissue matrices, the disclosed packages and methods may be suitable for other flexible sheet materials such as cellular tissues, composite structures (e.g., layered constructs), or engineered tissues (e.g., cultured tissue products forming sheet(s)).

Tissue matrix materials can be stored and packaged in a number of ways. For example, sheet tissue matrix materials are often stored in the presence of a liquid storage media. The liquid storage media can serve a number of important functions, including protecting the tissue during sterilization or storage, preventing microbial growth, and allowing use without extensive washing or rehydration. Exemplary storage solutions are described in U.S. Pat. No. 8,735,054, to LifeCell® Corporation.

In some cases, however, in a packaged storage solution, air pockets can form around the tissue matrix that can leave surface imperfections. In addition, handling of flexible tissues could be improved by modifying various packaging features, as discussed further below. The present packaging materials can improve tissue matrix surface features and cosmetics by preventing formation of air pockets during storage. In addition, the disclosed packaging can improve tissue matrix handling in the operating room.

FIG. 1 illustrates an open view of one embodiment of a tissue matrix package 100. The package 100 can be used to contain an acellular tissue matrix product 102 while retaining the acellular tissue matrix's shape. The package can have an outer structure or package 106 formed of sheets 110, 110'. The outer package can contain an inner supporting structure 104 formed of sheets of mesh material 108, 108'. The acellular tissue matrix 102 can be placed in the inner structure 104 between the two mesh sheets 108, 108', and the matrix 102 and mesh sheets which can be placed in the outer structure 106.

Figure 4:
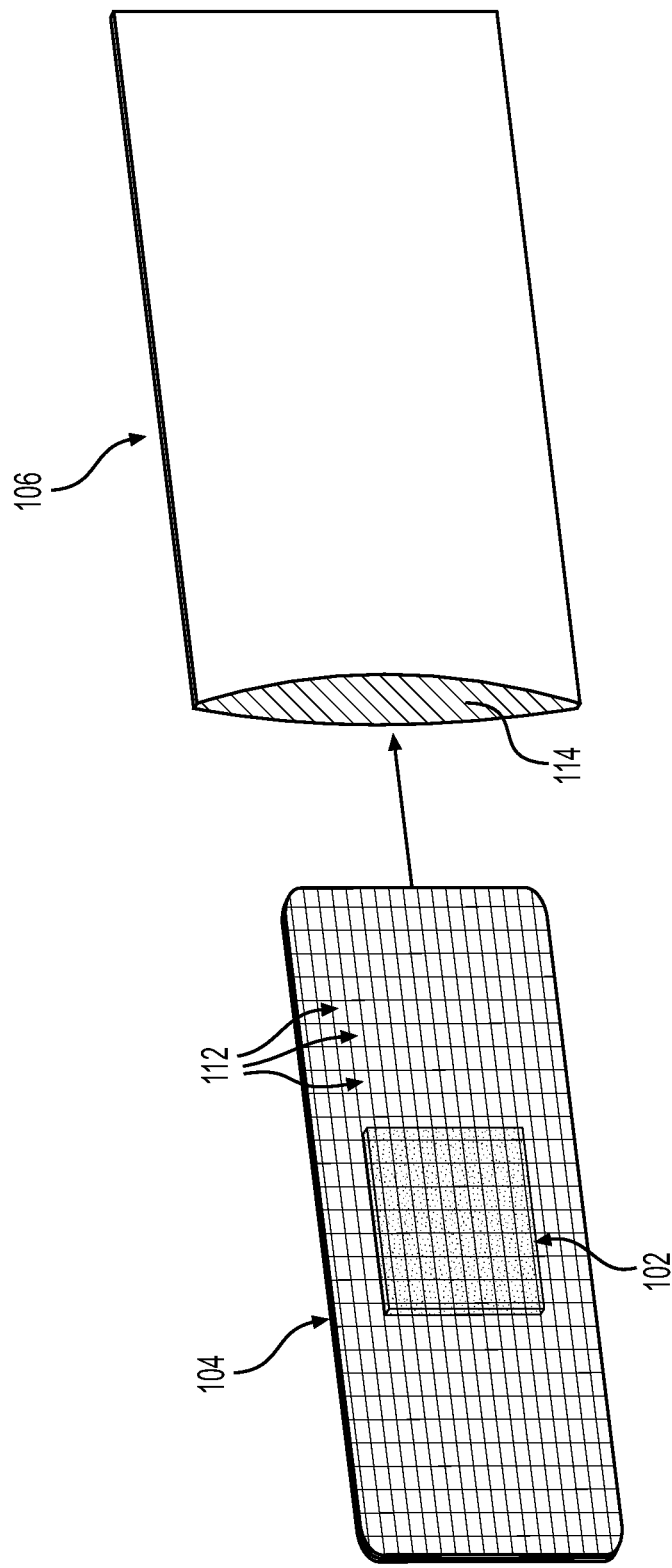
FIG. 4 illustrates a view of the inner structure being placed in the outer structure, according to certain exemplary embodiments.

The outer package 106 is designed to enclose or protect the inner structure 104 and acellular tissue matrix 102. Therefore, as described further below, the outer structure 106 can include sheets 110, 110' made from liquid impermeable material to contain the product, retain storage solution, and prevent entry of microbes. The sheets 110, 110' are generally attached, e.g., by heat sealing around a portion of their periphery, to form an envelope or package, as shown in FIG. 4, which is sealed prior to final sterilization.

The inner structure can be formed of mesh sheet(s) 108, 108'. As used herein, "mesh sheet" will be understood to refer to a porous, polymeric sheet with numerous small openings. The sheets can formed by a process such as weaving or knitting, or can include non-woven meshes. Pores or openings 112 formed in the polymeric mesh can allow passage of fluid or prevent formation of air bubbles. The pores or openings can also provide a texture that imparts a small degree of friction or gripping of a tissue matrix between sheets of mesh, thereby preventing movement, keeping the sheet of tissue matrix flat without rippling or sagging during storage, and allowing a user to grasp the inner structure 104 to pull the tissue matrix 102 contained in the structure 104 out during a surgical hand-off.

The sheets 108, 108' can be formed of a variety of suitable materials. Generally, suitable materials may be relatively inert, biocompatible, and/or nontoxic. In some embodiments, the mesh sheets 108, 108' can be made from a nonreactive polymer. The nonreactive polymer ensures that no unwanted reactions take place between the polymer and the acellular tissue matrix, storage liquid, or containers when storing and transporting a acellular tissue matrix 102. An inert polymer may also be selected to reduce unwanted reactions when sterilizing tissue in the tissue package 100 via irradiation. In some embodiments, the polymer can be a polyester. In other embodiments, the polymer can be polyethylene, polypropylene, polyamides (e.g., Nylon) or any other suitable material.

The sheets 108, 108' can have a variety of different sizes and shapes. For example, a typical design would include mesh sheets 108, 108' that are rectangular. In other embodiments, the mesh sheets 108, 108' can be square, circular, triangular, hexagonal, or other shapes. The sheets 108, 108' can be sized to completely cover or surround the acellular tissue matrix 102. As such the sheets 108 may be between about 5 cm×5 cm, up to 45 cm or more in longest dimensions. The mesh sheets 108, 108' can have a sufficient thickness and rigidity to provide desired physical support. For example, the thickness and stiffness of the polymer can be selected to maintain the tissue matrix 102 shape or prevent inadvertent folding. In some cases, the mesh sheets 108 have sufficient stiffness to prevent excessive bending or movement of the tissue matrix 102 and to allow surgical personnel to grab the sheets 108, 108' and enclosed tissue matrix from a partially opened outer package 106. Suitable thicknesses for the sheets 108, 108' can be between about 200 and 500 microns.

As noted above, the mesh sheets 108 can have a desired texture or porous structure. Generally, the porous structure or texture of a woven, knitted, or similarly configured polymeric mesh, will be determined by factors such as the thickness of the polymer strand(s) forming the mesh, the weave or knit pattern, or the weave or knit technique. For purposes of the present acellular tissue matrix packaging, the structure of the mesh will generally be selected to have polymer strand thicknesses and pore sizes that are sufficiently large to allow fluid transfer, provide desired texture and/or friction, while being small enough to prevent formation of an undesirably noticeable pattern or surface modification of the acellular tissue matrix.

The mesh sheets can be produced from a number of suitable medical-grade fabrics. For example, suitable fabrics can include SEFAR MEDIFAB® open weave fabrics or SAATI medical fabrics. As discussed previously, the mesh structure can be designed to provide a desired appearance of the tissue matrix after storage, e.g., by preventing fluid or air bubble formation. In addition, they mesh weave size and thread size can be small enough to prevent formation of a noticeable or undesired pattern on the surface of the tissue matrix. Suitable sizes can include woven meshes with yarn diameters from 50-400 micrometers, or more preferably 100-300 micrometers, and opening sizes of 50-500 micrometers, or more preferably 100-300 micrometers. Alternatively, suitable knit fabrics can be used similar to SEFAR MEDITEX® with opening sizes and yarn diameters within ranges discussed for woven materials.

Figure 2:
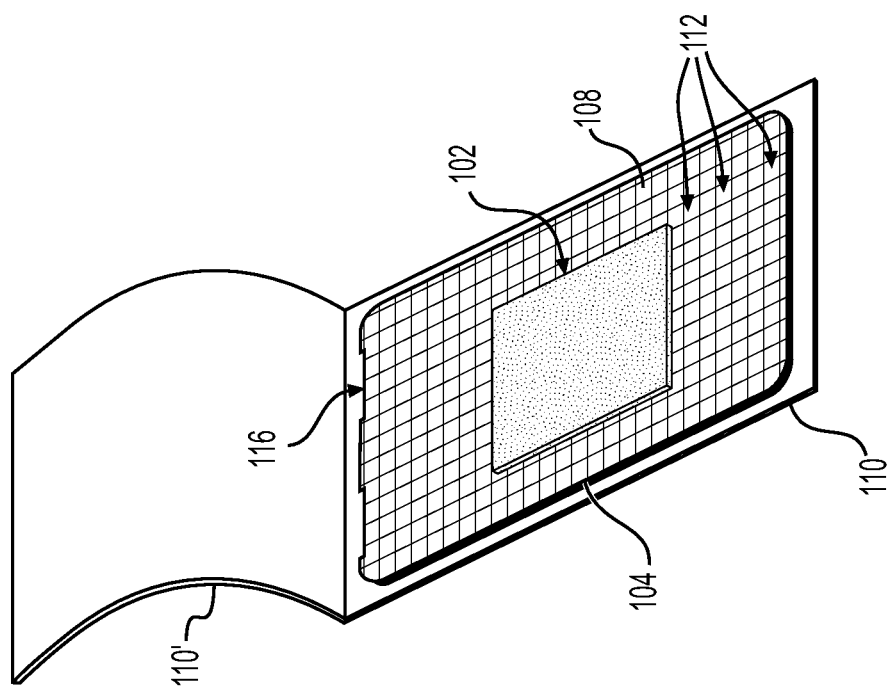
FIG. 2 illustrates a partially open view of a tissue product and associated packaging, according to certain exemplary embodiments.

In some embodiments, the mesh sheets 108, 108' are connected at a hinge 116, as illustrated in FIG. 2. The hinge 116 may be formed by folding or otherwise mechanically deforming a single sheet. Alternatively, the sheets 108, 108' can be separately formed and joined (e.g., by heating or other suitable attachment means). As shown, the hinge 116 includes several separate areas along one edge of the sheets, but it will be appreciated that the hinge 116 could be formed along the entire edge or other sections of the edge.

The inner structure 104 can include various alternative configurations. For example, rather than being joined along one edge, as shown, the sheets could be joined along two or more sides, e.g., along opposite edges, adjacent edges, or three edges, to form various configurations of pockets or holders for the tissue matrix. Furthermore, as noted previously, the sheets 108, 108' can have non-rectangular shapes that may be joined along a portion of their peripheries.

The outer structure 106 of the tissue package 100 as shown in FIG. 1 can be used to contain the inner structure 104. The outer structure 106 can be made of a polymeric film or foil. In one embodiment, the outer structure 106 has a transparent portion or side. The transparent portion can allow for easy viewing of the acellular tissue matrix 102 in the package 100. In some embodiments, a label can be printed on the outer structure 106, thereby reducing erroneous identification of the acellular tissue matrix 102 it contains.

Figure 3:
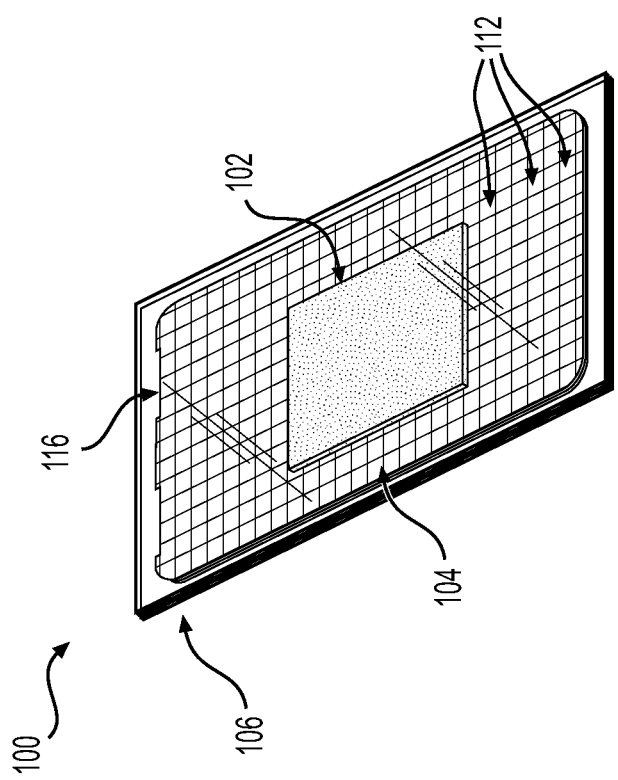
FIG. 3 illustrates an acellular tissue matrix product enclosed in a sheet of a mesh material and an outer package, according to certain exemplary embodiments.

FIG. 3 illustrates the outer structure or package 106 containing the inner structure 104 with a sheet of mesh material adjacent to a acellular tissue matrix 102. FIG. 4 illustrates the inner structure 104 containing the acellular tissue matrix 102 being placed in the outer structure 106 in an envelope or pouch shape. Generally, the outer structure will be provided as an envelope or pouch, as shown in FIG. 4, having been sealed along three of four sides, leaving an opening 114 for insertion of the inner structure 104 and tissue matrix. After placing the tissue matrix 102 and mesh sheets in the package, the opening 114 of the outer structure can be closed, e.g., by heat sealing. In some embodiments, air or other fluids can be removed to reduce the formation of air bubbles in the package 100.

Figure 5C:
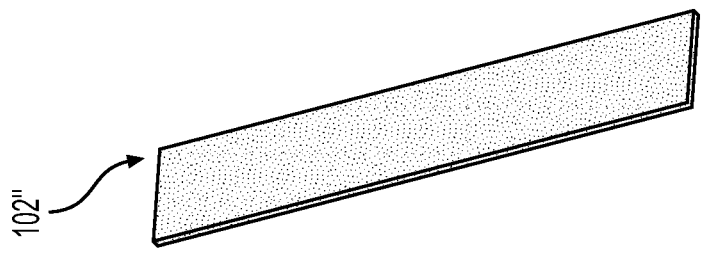
FIG. 5c illustrates yet another embodiment of a tissue matrix product that may be used with the disclosed packaging.
Figure 5B:
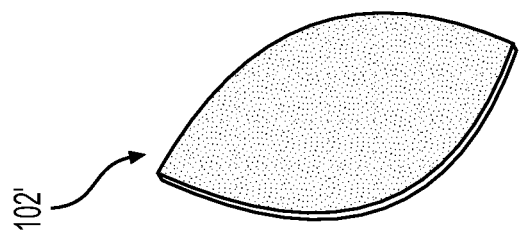
FIG. 5b illustrates another embodiment of a tissue matrix product that may be used with the disclosed packaging.
Figure 5A:
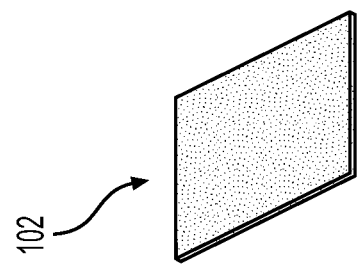
FIG. 5a illustrates one embodiment of a tissue matrix product that may be used with the disclosed packaging.

FIGS. 5a-5c illustrate views of different embodiments of the acellular tissue matrix 102, 102', 102". A variety of tissue matrices of suitable materials, shapes and sizes may be used for various reasons. For example, the acellular tissue matrix 102 can be a dermal tissue matrix. In another embodiment, the acellular tissue matrix 102 can be derived from human tissue. In other embodiments, the acellular tissue matrix 102 can be derived from porcine, ovine or other tissue. In some embodiments, the acellular tissue matrix 102 can be rectangular shaped. In other embodiments, the acellular tissue matrix 102 can be circular, oval, triangular, ovoid, teardrop, or irregularly shaped. In some embodiments, the acellular tissue matrix 102 may be in the form of a flexible sheet.

Figure 6:
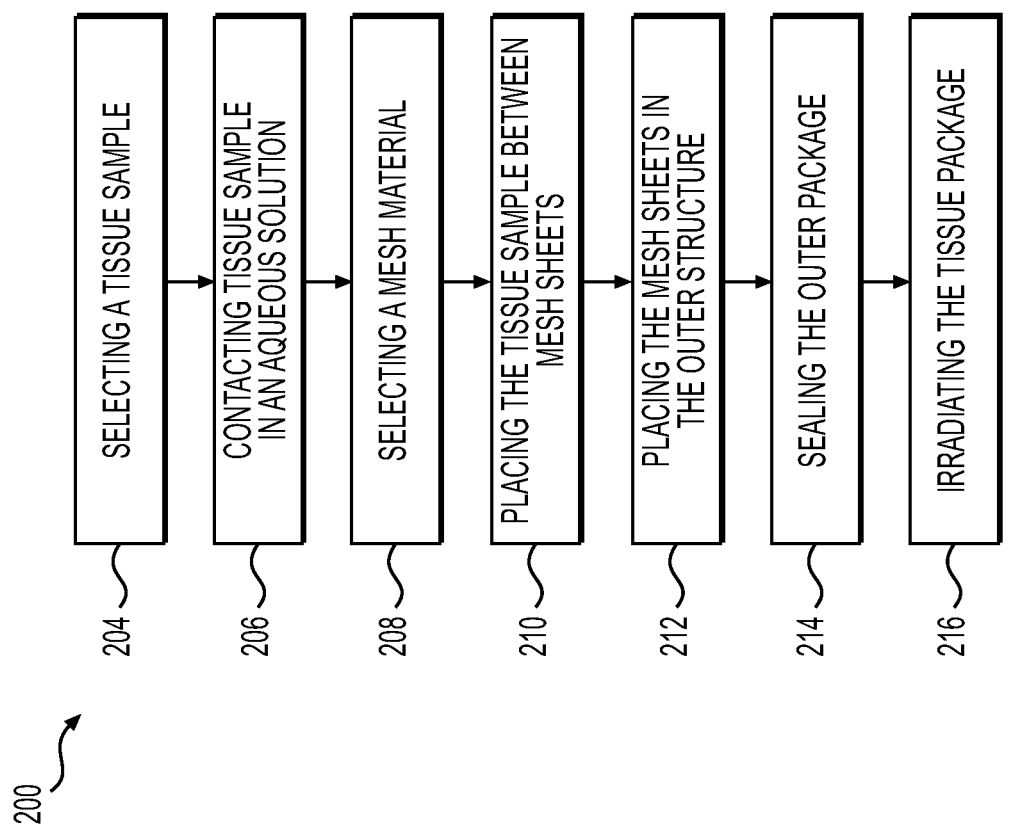
FIG. 6 is a flowchart illustrating a method of packaging a tissue matrix product, according to various embodiments.

FIG. 6 illustrates a method 200 of using the tissue package to store acellular tissue matrix. The skilled technician will recognize that the described method is suitable for various tissue matrix types.

First, at Step 204, an acellular tissue matrix product 102 in need of packaging or storage is selected. A suitable acellular tissue matrix 102 may be selected for a variety of reasons. The acellular tissue matrix 102 may be selected based on type of material, size, shape, or other reasons. In one embodiment, the selected acellular tissue matrix 102 may be a dermal acellular tissue matrix.

Next, as shown at Step 206, the acellular tissue matrix 102 may be placed or contacted with a storage solution. The solution can be selected for a number of purposes, including, for example, protecting the sample from radiation, preserving the tissue/preventing protein denaturization, or preventing bacterial growth. In some cases, the solution is aqueous, but other suitable tissue matrix storage solutions are known and suitable for use with the presently disclosed packaging.

Next, at Step 208 mesh sheet(s) 108, 108' are selected. A suitable mesh sheet may be selected for a variety of reasons. As discussed above, the sheet can include a single folded sheet or two sheets joined at a hinge. Next, as shown at Step 208, the tissue sample 102 is placed in meshed sheets 108, 108'. In one embodiment, a tissue sample 102 can be placed on a meshed sheet 108, and a second meshed sheet 108 may be placed over the tissue sample 102. In another embodiment, a tissue sample 102 may be placed on one meshed sheet 108 that is foldably connected to a second meshed sheet 108, 108'. This second meshed sheet 108 may be folded onto a tissue sample 102. In one embodiment, meshed sheets 108, 108' may be manipulated to form a pocket for a tissue sample 102. As shown at Step 212, the mesh sheets 108 are placed in the outer structure 106. Next, the package is sealed and as shown at the 214, with the acellular tissue matrix and mesh sheets 108 inside the outer structure 106, forming a tissue package 100.

In some embodiments, as shown in Step 216, the tissue package 100 can be irradiated in order to sterilize the acellular tissue matrix 102 inside the tissue package 100. For example, suitable radiation can include e-beam, gamma, x-ray, or other sterilization means.

What is claimed is:

1. A packaged tissue matrix product, comprising:
    an inner structure configured to hold a sheet of flexible acellular tissue matrix, the inner structure comprising at least one sheet of a mesh material;
    a sheet of flexible acellular tissue matrix supported by the inner structure;
    a liquid storage solution in contact with the acellular tissue matrix; and
    an outer structure surrounding and enclosing the acellular tissue matrix, the inner structure and storage solution.

2. The packaged tissue matrix product of claim 1, wherein the outer structure has at least one transparent side, allowing the acellular tissue matrix to be visible from outside the outer structure.

3. The packaged tissue matrix product of claim 1, wherein the mesh material is polymeric.

4. The packaged tissue matrix product of claim 1, wherein the mesh material has a thickness between 300 and 500 µm.

5. The packaged tissue matrix product of claim 1, wherein the inner structure comprises two sheets of mesh material.

6. The packaged tissue matrix product of claim 5, wherein the sheets of mesh material are connected.

7. The packaged tissue matrix product of claim 6, wherein the sheets of mesh materials are connected at a hinge.

8. The packaged tissue matrix product of claim 1, wherein the tissue matrix is derived from a human tissue.

9. The packaged tissue matrix product of claim 1, wherein the tissue matrix is derived from porcine tissue.

10. The packaged tissue matrix product of claim 5, wherein the two sheets of mesh material each comprises a polymeric mesh.

11. The packaged tissue matrix product of claim 5, wherein the two sheets of mesh material each has a thickness between 300 and 500 µm.

12. The packaged tissue matrix product of claim 7, wherein the hinge is formed by heat welding.

13. The packaged tissue matrix product of claim 1, wherein the mesh material is a woven mesh.

14. The packaged tissue matrix product of claim 1, wherein the mesh material is formed from at least one of polyester, polypropylene, or polyamide.

15. The packaged tissue matrix product of claim 1, wherein the mesh material comprises a polymeric fabric with a strand thickness of 50-500 micrometers and openings sized between about 50 and 400 micrometers.

16. The packaged tissue matrix product of claim 1, wherein the inner structure and the outer structure are separate components.

* * * * *